July 14, 1964    C. E. CRAIGO ETAL    3,140,842
FLEXIBLE WING AIRCRAFT

Filed March 17, 1961    3 Sheets-Sheet 1

INVENTORS
CECIL E. CRAIGO
HARRY A. JAMES
LEO J. HAND
By *Knox & Knox*

July 14, 1964   C. E. CRAIGO ETAL   3,140,842
FLEXIBLE WING AIRCRAFT

Filed March 17, 1961   3 Sheets-Sheet 2

INVENTORS
CECIL E. CRAIGO
HARRY A. JAMES
LEO J. HAND

By *Knox & Knox*

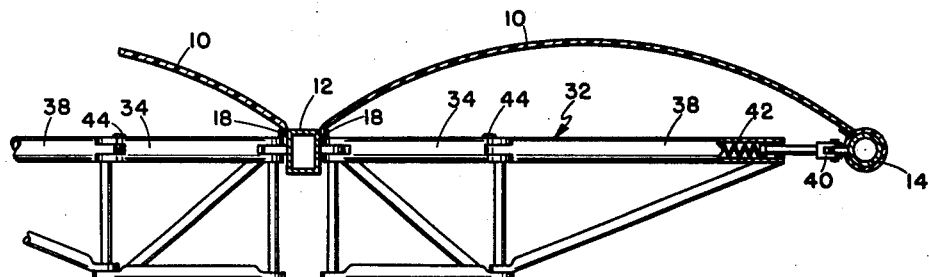
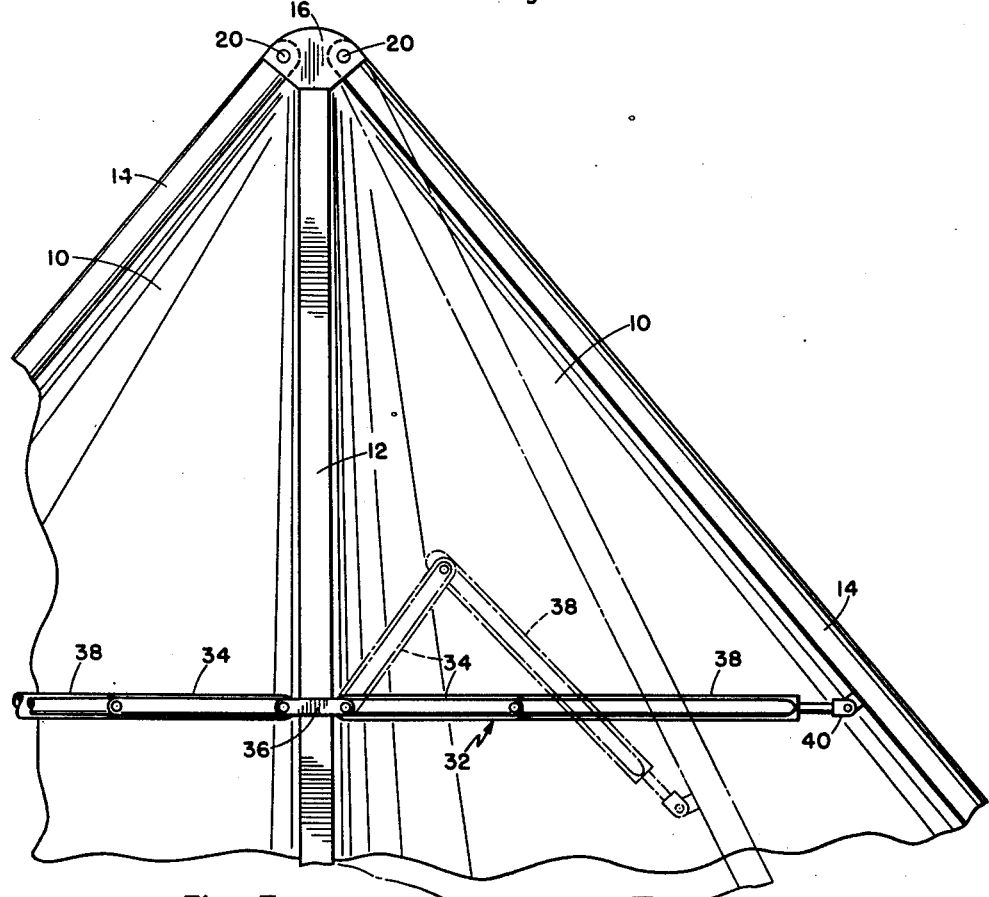

United States Patent Office 3,140,842
Patented July 14, 1964

3,140,842
FLEXIBLE WING AIRCRAFT
Cecil E. Craigo, Harry A. James, and Leo J. Hand, San Diego, Calif., assignors to The Ryan Aeronautical Co., San Diego, Calif.
Filed Mar. 17, 1961, Ser. No. 96,574
8 Claims. (Cl. 244—46)

The present invention relates generally to aircraft and more particularly to a flexible wing aircraft.

Aircraft for specialized purposes are often complex and limited in performance. For example, a helicopter is expensive to build, has a limited payload and comparatively low top speed, while being capable of vertical take-off and landing. Aircraft designed for vertical or short take-off and landing, while retaining high speed performance, have complex thrust deflecting systems, or auxiliary propulsion means, which reduce useful payload. For maximum payload carrying capabilities, airframe weight must be kept to a minimum and to reduce take-off and landing distances, aerodynamic efficiency must be increased. Also, power requirements must be within reasonable limits to permit the carrying of sufficient fuel for a useful operating range. For convenience of handling and operation the aircraft must be compact, easily maneuverable and require a minimum of maintenance.

The primary object of this invention therefore, is to provide an aircraft in which structural weight is minimized by using a flexible wing held in extended flight position by a minimum of rigid structure, the wing being foldable when not in use to reduce the required storage space, the airframe structure being pivotally suspended from the wing and control being effected by shifting the aircraft's center of gravity relative to the wing's center of pressure.

Another object of this invention is to provide an aircraft in which the flexible wing is inherently stable and automatically compensates for gust conditions, so that flying is simple and smooth.

Another object of this invention is to provide an aircraft in which the control system is extremely simple and is functionally similar to conventional systems, so that control is instinctive.

A further object of this invention is to provide an aircraft adaptable to many different speed ranges and which can be powered by various conventional propulsion units, without the need for thrust deflection or special controls.

Finally, it is an object to provide an aircraft of the aforementioned character which is simple and convenient to construct and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 6 is an enlarged sectional view taken on the line 6—6 of FIGURE 1; and

FIGURE 7 is a bottom plan view of the structure as illustrated in FIGURE 6.

*Wing Assembly*

Figure 1:
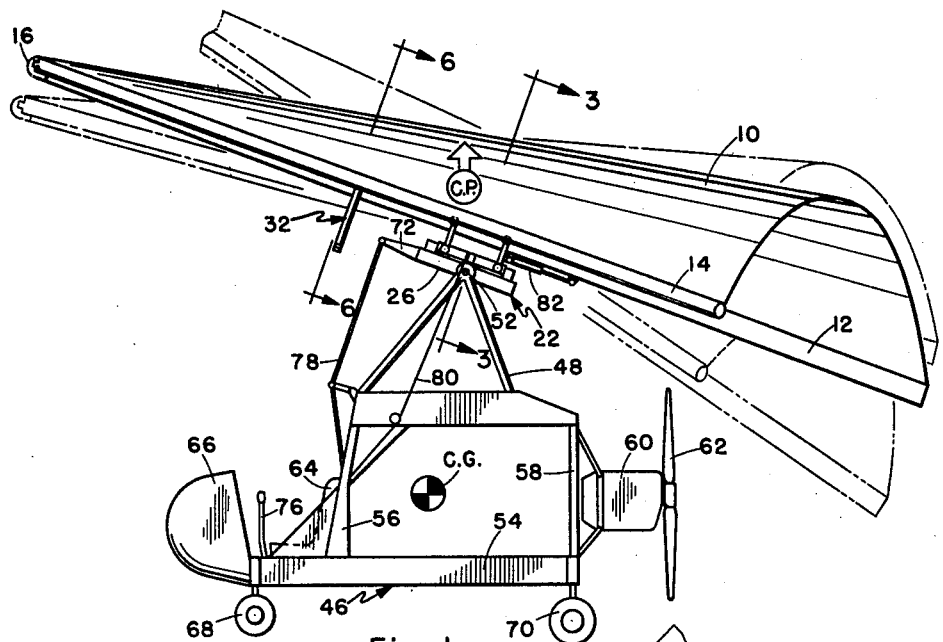
FIGURE 1 is a side elevation view of the aircraft.

The aircraft utilizes a delta type wing comprising a pair of flexible, triangular panels 10 extending on opposite sides of a central, rigid keel 12, the outer edges of the panels being supported by leading edge members 14 sweeping rearwardly and outwardly from a nose block 16 at the forward end of said keel. This particular wing arrangement is known as a Rogallo type wing and is a development of principles described in U.S. Patent No. 2,546,078, issued March 20, 1951, to G. S. Rogallo et. al. The aircraft as illustrated is a utility cargo carrying vehicle for relatively low speed operation and is ideally suited to an explanation of the adaption of the flexible wing to a functional aircraft and the control system involved. It should be understood, however, that the control and operation of the wing as hereinafter described are adaptable to many different aircraft configurations, both powered and unpowered. The wing itself has been found to be stable from very low speeds to extremely high speeds, even supersonic, using suitable material for the flexible panels.

The keel 12 is preferably a light weight, but rigid box member, the inner edges of the panels 10 being secured to the top positions of the longitudinal sides and held in place by retaining strips 18 secured by screws, rivets, or the like. The leading edge members 14 are pivotally attached to the nose block 16 by hinge pins 20 to swing in a plane parallel to the keel 12 and thus may be folded inwardly against the keel for storage purposes. The outer edges of the panels 10 are illustrated as wrapped around the leading edge members 16 in a sleeve-like manner, but various attachment strips, brackets, or the like may be used. The panels 10 are flexible material, such as fabric, plastic, or combinations thereof, according to the size and performance requirements.

Figure 3:
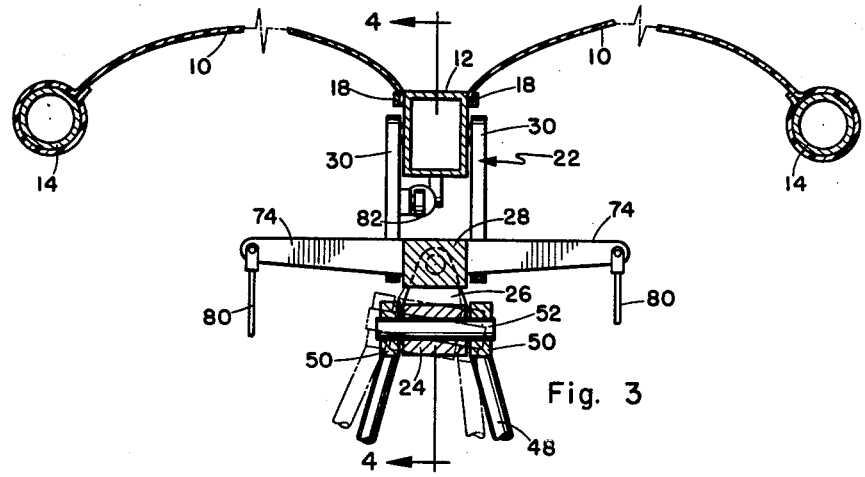
FIGURE 3 is an enlarged sectional view taken on the line 3—3 of FIGURE 1.
Figure 4:
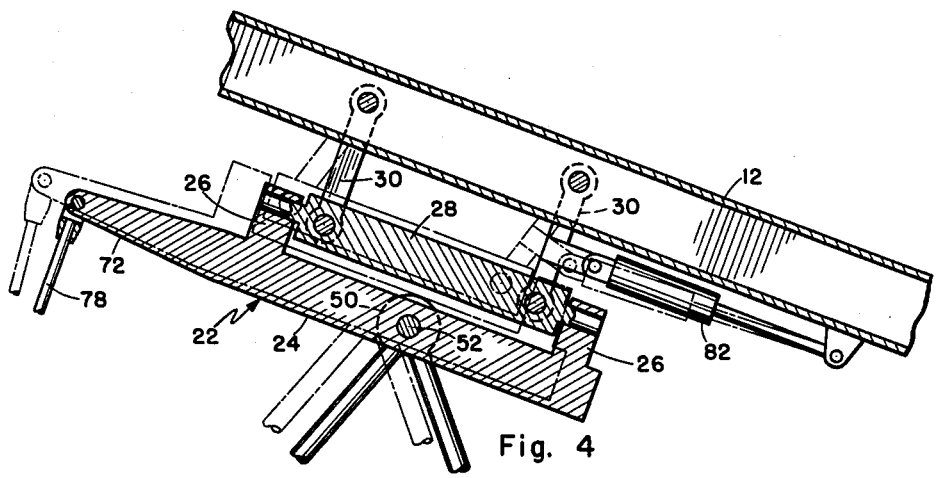
FIGURE 4 is a sectional view taken on the line 4—4 of FIGURE 3.
Figure 5:
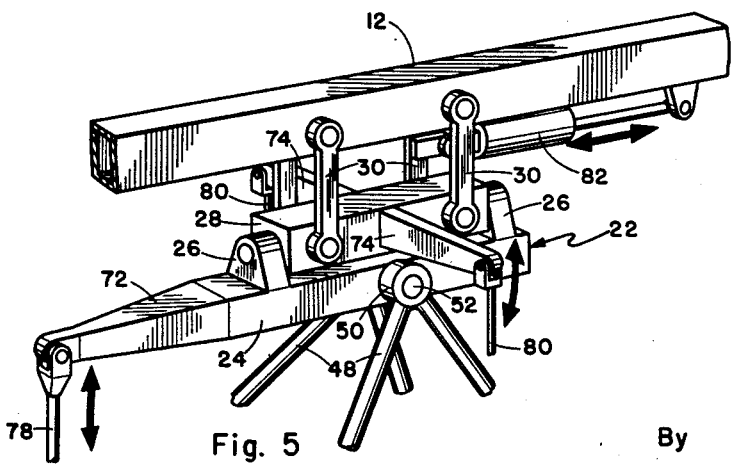
FIGURE 5 is a perspective view of the control head assembly.

Attached below the keel 12 is a control head assembly 22, best illustrated in FIGURES 3-5, the assembly comprising a pitch bar 24 on which are upright brackets 26, the brackets providing end bearings for a roll bar 28 which is rotatable on an axis parallel to and vertically displaced below the keel. The roll bar 28 is coupled to the keel 12 by longitudinal spaced, opposed pairs of parallelogram links 30, pivotal at both ends so that the roll bar is movable longitudinally relative to the keel but remains parallel thereto.

The wing is held in open position by a spreader bar assembly 32, comprising a pair of inner truss members 34, the upper corners of which are pivotally attached on opposite sides of the keel 12, the lower corners being interconnected by a tie link 36. Pivotally attached to the outer ends of the truss members 34 are outwardly extending extension arms 38, each having at the outer end thereof a slidable attachment fork 40 biased outwardly by a spring 42. The attachment forks 40 are pivotally attached to the leading edge members 14, so that, by folding the spreader bar assembly forwardly in a gate-like manner, as indicated in broken line in FIGURE 7, the leading edge members are retracted inwardly and the wing is folded. In the spread position, the spreader bar assembly 32 is held open by lock pins 44 at the hinges of the truss members 34 and extension arms 38. The spreader bar assembly structure may be varied considerably to suit specific load requirements and other types of locking and retracting means may be used.

*Airframe Structure*

Suspended from the control head assembly 22 is an airframe structure 46, at the top of which is a tubular pylon 48 having at its upper end a pair of opposed trunnions 50. The pitch bar 24 has a cross shaft 52 which is journalled in the trunnions 50, allowing said pitch bar to swing on a horizontal axis normal to the keel 12. The airframe structure 46 is thus movable relative to the wing on two orthogonal axes. The pitch axis of shaft 52 is substantially vertically below the aerodynamic center of pressure of the wing and is also midway between the links 30, so that the assembly is generally balanced. Below the pylon 48 is a platform 54, having upright front posts 56 and rear posts 58 which support the pylon and leave a considerable portion of said platform open as a cargo space. Attached to the rear posts 58 is an engine 60 driving a pusher type propeller 62 for forward propulsion. At the forward end of the platform 54 is a pilot's seat 64 and a nose section 66 to carry the necessary aircraft instruments in a conventional arrangement. The aircraft is provided with suitable wheels 68 and 70 at the front and rear of platform 54 and one or both pairs of wheels may be castoring or steerable to facilitate ground handling.

Controls

Extending from the forward end of the pitch bar 24 is a pitch control arm 72, while fixed to the roll bar 28 are laterally opposed roll control arms 74. Adjacent to the pilot's seat is a control column 76 which is coupled to the pitch control arm 72 by rod linkages 78 and to the roll control arms 74 by cables 80. The complete control connections, not shown, are functionally similar to those in conventional aircraft and may be of any well known type. Engine, propeller pitch and ground steering controls are also of conventional type and may be installed in any well known manner to fit particular structure.

In order to simplify flying, a trim control is provided in the form of an axially adjustable jack 82 attached at one end to one of the parallelogram links 30 and at the other end to the keel 12. The jack can be electrically, hydraulically, or mechanically actuated. By actuating the jack 82 the wing can be shifted longitudinally relative to the cross shaft 52, as indicated in broken line in FIGURE 4, thus shifting the wing center of pressure relative to the aircraft center of gravity by small, closely controllable amounts and providing for accurate trim in flight.

Operation

Figure 2:
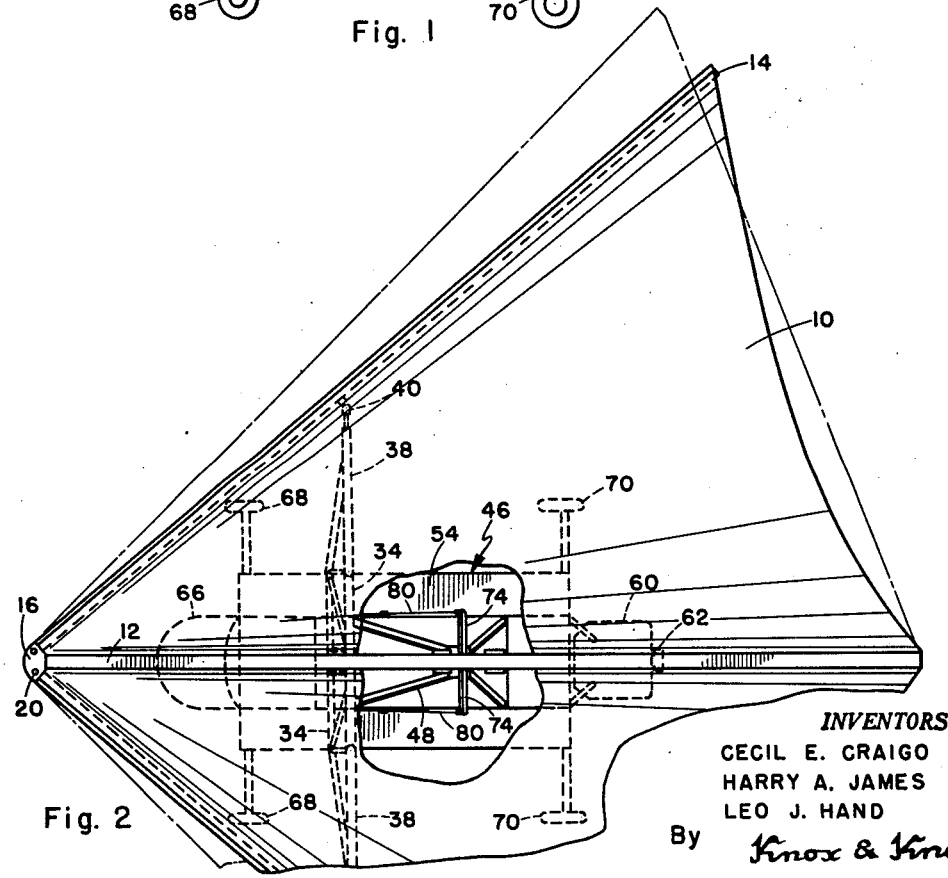
FIGURE 2 is a partial top plan view thereof.

With the wing folded, the aircraft will fit into a very small space compared to conventional aircraft of similar capacity. When the wing is extended, the panels 10 are stretched substantially flat, but in forward motion the lifting effect of the airstream causes the panels to bow upwardly, as in FIGURES 1, 3 and 6, which pulls in the leading edge members 14 to a greater degree of sweep back. In FIGURE 2, the static configuration of the wing is indicated in broken line and the in-flight shape in full line. It should be noted that the flexible wing operates at a considerably greater angle of incidence than a rigid wing, about 20 degrees positive incidence being typical for cruising flight.

Take-off can be made in a normal manner with an extended ground run. Alternatively, the take-off run can be greatly reduced by first accelerating the aircraft to a predetermined speed and then shifting the wing to a high angle of incidence, or flare position, as indicated in one broken line position in FIGURE 1. This causes the aircraft to climb steeply, depending on the power of the engine, to the required altitude or to clear obstructions, so permitting operation from restricted areas.

In flight, control is accomplished by normal movements of the control column 76. However, while the results are normal, the action is somewhat different from that of conventional aircraft. The flexible wing is an extremely stable aerodynamic platform and resists deflection from a straight flight path. Thus a forward motion of the control column 76, instead of pulling the pitch control arm 72 downwardly, actually swings the airframe structure forwardly about the axis of cross shaft 52. This shifts the aircraft center of gravity, or C.G. forwardly of the wing center of pressure and produces a nose down moment, which then causes the wing to decrease its angle of attack, as indicated in a further broken line position in FIGURE 1 and places the aircraft in a dive. Similarly, a rearward shift of the C.G. causes the aircraft to climb. Roll or banking control is accomplished by left or right motion of the control column utilizing the cables 80 to the roll control arms 74, which causes the airframe structure to swing to one side or the other about the roll axis of roll bar 28. This action shifts the C.G. to the side of the wing center of pressure, which in turn produces a banking motion of the entire aircraft. All aerodynamic control of the aircraft is thus accomplished by shifting the C.G. which is necessary to provide the powerful moment needed to deflect the highly stable wing.

Auxiliary control surfaces could be mounted on the airframe structure and may be desirable on certain configurations of aircraft, but would, unless themselves collapsible, necessitate extra storage space for the aircraft.

The wing as illustrated has provision for automatic gust compensation to ensure smooth flight. This is made possible by the spring biased ends of the spreader bar assembly 32 which allow angular motion of the leading edge members 14. When a gust of wind strikes the aircraft the panels 10 tend to billow upwardly, which causes the leading edge members 14 to be pulled inwardly. This increases the sweep back angle of the wing and decreases the coefficient of lift, preventing the aircraft from rising due to the increased effective airspeed from the gust. In this manner gusts are automatically damped out. The spring biased spreader bar structure is the preferred means for allowing gust compensation, but for certain applications it may be desirable to use a rigid spreader bar and design the leading edge members with sufficient resiliency or flexibility to provide the necessary sweepback angle changes.

Since the primary portion of the wing consists of thin flexible panels, the structural weight is held to a minimum, resulting in an exceptionally high payload capacity. The simplified utility aircraft illustrated has a platform 54 on which considerable cargo can be carried and concentrated near the C.G. Many different arrangements are possible using various types of propulsion means. The aircraft is also adaptable as a glider for towing or for air dropping, the foldable wing making it simple to carry such a glider internally or slung from a carrier aircraft. The simple control system is readily adaptable to remote operation, such as by radio command.

It is understood that minor variation from the form of the invention disclosed herein may be made without departure from the spirit and scope of the invention, and that the specification and drawing are to be considered as merely illustrative rather than limiting.

We claim:
1. An aircraft, comprising:
a wing having a lifting panel, freely flexible in one direction;
supporting structure attached to and supporting certain edges of said panel;
an airframe structure suspended from said wing and being pivotally attached thereto substantially at the aerodynamic center of pressure of the wing;
and control means coupled between said wing and said airframe structure to shift the center of gravity of the airframe structure relative to the center of pressure of the wing, thereby applying a deflecting moment to the aircraft.
2. An aircraft, comprising:
a substantially triangular wing having a rigid central keel;
wing panels, freely flexible in one direction, attached longitudinally to said keel at their inner edge and extending on opposite sides thereof;
substantially rigid leading edge members secured to the forward end of said keel and extending angularly rearwardly and outwardly therefrom;

said leading edge members being attached to and supporting the outer edges of said wing panels;

an airframe structure pivotally attached to and suspended from said keel substantially at the aerodynamic center of pressure of the wing;

and control means coupled between said wing and said airframe structure to shift the center of gravity of the airframe structure relative to the center of pressure of the wing, thereby applying a deflecting moment to the aircraft.

3. An aircraft, comprising:

a substantially triangular wing having a rigid central keel;

wing panels, freely flexible in one direction, attached longitudinally to said keel at their inner edge and extending on opposite sides thereof;

substantially rigid leading edge members secured to the forward end of said keel and extending angularly rearwardly and outwardly therefrom;

said leading edge members being attached to and supporting the outer edges of said wing panels;

said leading edge members having limited freedom of angular change relative to said keel;

an airframe structure pivotally attached to and suspended from said keel substantially at the aerodynamic center of pressure of the wing;

and control means coupled between said wing and said airframe structure to shift the center of gravity of the airframe structure relative to the center of pressure of the wing, thereby applying a deflecting moment to the aircraft.

4. An aircraft, comprising:

a substantially triangular wing having a rigid central keel;

wing panels, freely flexible in one direction, attached longitudinally to said keel at their inner edges and extending on opposite sides thereof;

leading edge members attached to the forward end of said keel, extending angularly rearwardly and outwardly therefrom and being pivotal to swing in the plane of said keel;

said leading edge members being attached to and supporting the outer edges of said wing panel;

spreader bar means connected between said leading edge members and said keel;

said leading edge members having limited freedom of angular change relative to said keel;

an airframe structure pivotally attached to and suspended from said keel substantially at the aerodynamic center of pressure of the wing;

and control means coupled between said wing and said airframe structure to shift the center of gravity of the airframe structure relative to the center of pressure of the wing, thereby applying a deflecting moment to the aircraft.

5. An aircraft, comprising:

a substantially triangular wing having a rigid central keel;

wing panels, freely flexible in one direction, attached longitudinally to said keel at their inner edges and extending on opposite sides thereof;

leading edge members attached to the forward end of said keel, extending angularly rearwardly and outwardly therefrom and being pivotal to swing in the plane of said keel;

said leading edge members being attached to and supporting the outer edges of said wing panel;

spreader bar means connected between said leading edge members and said keel;

said spreader bar means having resilient portions and providing limited freedom of angular movement of said leading edge members relative to said keel;

an airframe structure pivotally attached to and suspended from said keel substantially at the aerodynamic center of pressure of the wing;

and control means coupled between said wing and said airframe structure to shift the center of gravity of the airframe structure relative to the center of pressure of the wing, thereby applying a deflecting moment to the aircraft.

6. An aircraft according to claim 5 wherein said spreader bar means is foldable, whereby said leading edge members and said wing panels are foldable alongside said keel.

7. An aircraft, comprising:

a substantially triangular wing having a rigid central keel;

wing panels, freely flexible in one direction, attached longitudinally to said keel at their inner edges and extending on opposite sides thereof;

leading edge members attached to the forward end of said keel, extending angularly rearwardly and outwardly therefrom and being pivotal to swing in the plane of said keel;

said leading edge members being attached to and supporting the outer edges of said wing panel;

spreader bar means connected between said leading edge members and said keel;

said leading edge members having limited freedom of angular change relative to said keel;

a control head attached below said keel substantially at the aerodynamic center of pressure of said wing;

an airframe structure suspended from said control head and being pivotal on a first, roll axis parallel to said keel and on a second, pitch axis normal to said keel;

and control means coupled between said control head and said airframe structure to swing the airframe structure and shift the center of gravity thereof relative to the aerodynamic center of pressure of said wing, thereby applying a deflecting moment to the aircraft.

8. An aircraft, comprising:

a substantially triangular wing having a rigid central keel;

freely flexible wing panels attached longitudinally to said keel at their inner edges and extending on opposite sides thereof;

leading edge members attached to the forward end of said keel, extending angularly rearwardly and outwardly therefrom and being pivotal to swing in the plane of said keel;

said leading edge members being attached to and supporting the outer edges of said panel;

spreader bar means connected between said leading edge members and said keel;

said leading edge members having limited freedom of angular change relative to said keel;

a control head attached below said keel substantially at the aerodynamic center of pressure of said wing;

an airframe structure suspended from said control head and being pivotal on a first, roll axis parallel to said keel and on a second, pitch axis normal to said keel;

control means coupled between said control head and said airframe structure to swing the airframe structure and shift the center of gravity thereof relative to the aerodynamic center of pressure of said wing, thereby applying a deflecting moment to the aircraft;

and trim means connected between said control head and said keel to shift the control head longitudinally parallel to the keel.

References Cited in the file of this patent

UNITED STATES PATENTS

| | | |
|---|---|---|
| 989,786 | Lee | Apr. 18, 1911 |
| 2,128,060 | Spratt | Aug. 23, 1938 |